(12) United States Patent
Chang et al.

(10) Patent No.: US 11,230,043 B2
(45) Date of Patent: Jan. 25, 2022

(54) METHOD FOR SETTING MOLDING CONDITIONS OF INJECTION-MOLDING EQUIPMENT

(71) Applicant: CORETECH SYSTEM CO., LTD., Chupei (TW)

(72) Inventors: Rong-Yeu Chang, Chupei (TW); Chia-Hsiang Hsu, Chupei (TW); Chuan-Wei Chang, Chupei (TW)

(73) Assignee: CORETECH SYSTEM CO., LTD., Chupei (TW)

( * ) Notice: Subject to any disclaimer, the term of this patent is extended or adjusted under 35 U.S.C. 154(b) by 0 days.

(21) Appl. No.: 16/892,547

(22) Filed: Jun. 4, 2020

(65) Prior Publication Data

US 2020/0384674 A1     Dec. 10, 2020

Related U.S. Application Data

(60) Provisional application No. 62/856,970, filed on Jun. 4, 2019.

(51) Int. Cl.
*B29C 45/76*     (2006.01)
*G06F 30/20*     (2020.01)
(Continued)

(52) U.S. Cl.
CPC ............ *B29C 45/76* (2013.01); *B29C 45/766* (2013.01); *G06F 30/10* (2020.01); *G06F 30/20* (2020.01);
(Continued)

(58) Field of Classification Search
CPC ...................................................... B29C 45/76
See application file for complete search history.

(56) References Cited

U.S. PATENT DOCUMENTS 4,816,197 A * 3/1989 Nunn ..................... B29C 45/76
                                                              264/40.1
5,035,598 A * 7/1991 Fujita ................... B29C 45/768
                                                              425/144
(Continued)

OTHER PUBLICATIONS

Rubenstein et al. "Design and Implementation of Productivity Monitoring System in Rubber Injection Molding Machine in Real Time Based on Visual Studio and Android Application." IOP Conference Series: Materials Science and Engineering. vol. 384. No. 1. IOP Publishing, Nov. 16, 2017. (Year: 2017).*

(Continued)

*Primary Examiner* — Benjamin A Schiffman
(74) *Attorney, Agent, or Firm* — Muncy, Geissler, Olds & Lowe, P.C.

(57) ABSTRACT

A system for setting injection-molding conditions and a method for setting actual molding conditions of an injection-molding machine are disclosed. The system includes a computer and an injection-molding equipment. The computer is configured to simulate, via computer-aided simulation software, a virtual molding using a plurality of design parameters to generate a plurality of provisional molding conditions. The injection-molding equipment is associated with the computer and configured to perform at least one trial molding using the provisional molding conditions to obtain a plurality of intermediate molding conditions. The computer optimizes the provisional molding conditions to obtain actual molding conditions in accordance with the intermediate molding conditions.

7 Claims, 11 Drawing Sheets

(51) Int. Cl.
  *G06F 30/10* (2020.01)
  *G06F 119/18* (2020.01)
  *G06F 113/22* (2020.01)

(52) U.S. Cl.
  CPC ............ *B29C 2945/7629* (2013.01); *B29C 2945/76913* (2013.01); *B29C 2945/76993* (2013.01); *G06F 2113/22* (2020.01); *G06F 2119/18* (2020.01)

(56) References Cited

U.S. PATENT DOCUMENTS

| | | | | |
|---|---|---|---|---|
| 5,097,431 A * | 3/1992 | Harada | ............... | B29C 45/76 |
| | | | | 703/9 |
| 5,260,010 A * | 11/1993 | Yokota | ............... | B29C 45/76 |
| | | | | 264/40.4 |
| 5,756,017 A * | 5/1998 | Togawa | ............... | B29C 45/77 |
| | | | | 264/40.1 |
| 5,792,483 A * | 8/1998 | Siegrist | ............... | B29C 45/5008 |
| | | | | 425/135 |
| 5,911,924 A * | 6/1999 | Siegrist | ............... | B29C 45/7653 |
| | | | | 264/40.1 |
| 6,658,319 B2 * | 12/2003 | Shioiri | ............... | B29C 45/766 |
| | | | | 264/40.1 |
| 6,816,820 B1 * | 11/2004 | Friedl | ............... | B29C 33/3835 |
| | | | | 703/2 |
| 7,323,125 B2 * | 1/2008 | Uwaji | ............... | B29C 45/7693 |
| | | | | 264/328.1 |
| 7,574,339 B2 * | 8/2009 | Lukis | ............... | G06F 30/327 |
| | | | | 703/9 |
| 8,460,586 B2 * | 6/2013 | Kariya | ............... | B29C 45/762 |
| | | | | 264/40.5 |
| 8,768,662 B2 * | 7/2014 | Chang | ............... | G06F 30/20 |
| | | | | 703/2 |
| 9,283,695 B1 * | 3/2016 | Tseng | ............... | B29C 33/3835 |
| 9,409,335 B1 * | 8/2016 | Su | ............... | G06F 30/20 |
| 9,555,571 B1 * | 1/2017 | Chang | ............... | G05B 19/401 |
| 9,573,307 B1 * | 2/2017 | Tseng | ............... | B29C 45/0005 |
| 9,684,295 B2 * | 6/2017 | Chang | ............... | B29C 45/7693 |
| 2004/0047935 A1 * | 3/2004 | Moss | ............... | B29C 45/2704 |
| | | | | 425/145 |
| 2005/0082707 A1 * | 4/2005 | Sabin | ............... | B29C 45/766 |
| | | | | 264/40.1 |
| 2010/0036646 A1 * | 2/2010 | Hisai | ............... | G06F 30/23 |
| | | | | 703/1 |

OTHER PUBLICATIONS

Lee, Hwaseop, Kwangyeol Ryu, and Youngju Cho. "A framework of a smart injection molding system based on real-time data." Procedia Manufacturing 11 (Sep. 18, 2017): 1004-1011. (Year: 2017).*

Final Office Action issued in co-pending U.S. Appl. No. 16/911,082, dated Mar. 22, 2021.

Non-Final Office Action issued in co-pending U.S. Appl. No. 16/911,082 with a notification date of Dec. 11, 2020 (185 pages).

* cited by examiner

| Molding Process Sheet ||||||
|---|---|---|---|---|---|
| Project Information ||||||
| Project Name | - || Date | - ||
| Mash File Name | - || Run ID | 1 ||
| Runner Type | Cold runner || Cavity | 2 ||
| Molding Data ||||||
| Injection Machine Maker | NISSEI || Machine Grade | NEX40 ||
| Screw Diameter (mm) | 25 || Clamping Force (Ton) | 40 ||
| Polymer | PC || Producer | CHIMEI ||
| Grade Name | WonderLite || Part Weight (g) | 30 ||
| Temperature Setting ||||||
| Nozzle (°C) | 290 ||| Mold (°C) | 100 |
| Injection Setting ||||||
|  | 1 | 2 | 3 | 4 | 5 |
| Speed (mm/sec) | 30 | 70 | 90 | 50 | --- |
| Pressure (Mpa) | 120 | 120 | 120 | 120 | --- |
| Position (mm) | 45 | 32 | 20 | --- | --- |
| Melt Position (mm) | 50 || Suck Back (mm) | 3 ||
| Switch over ||||||
| Switch Over Point (mm) | 12 || Switch Over Pressure (Mpa) | 55 ||
| Packing Pressure ||||||
|  | 1 | 2 | 3 | 4 | 5 |
| Pressure (Mpa) | 60 | 40 | 20 | --- | --- |
| Time (sec) | 2 | 2 | 1 | --- | --- |
| Time Record ||||||
| Injection Time (sec) | 1.3 || Pack Pressure Time (Sec) | 5 ||
| Cool Time (sec) | 15 || Mold Open Time (sec) | 5 ||
| Cycle Time (sec) ||||| 26.3 |

| Time | Pressure#1 |
|---|---|
| 0.04 | 1.65 |
| 0.05 | 1.65 |
| 0.06 | 1.88 |
| 0.07 | 2 |
| 0.08 | 2.23 |
| 0.09 | 2.35 |
| 0.1 | 2.59 |
| 0.11 | 4.35 |
| 0.12 | 6.23 |
| 0.13 | 7.99 |
| 0.14 | 9.64 |
| 0.15 | 11.28 |
| 0.16 | 12.93 |
| 0.17 | 15.04 |
| 0.18 | 15.39 |
| 0.19 | 15.86 |
| 0.2 | 16.22 |
| 0.21 | 16.69 |
| 0.22 | 17.04 |
| 0.23 | 17.51 |

METHOD FOR SETTING MOLDING CONDITIONS OF INJECTION-MOLDING EQUIPMENT

PRIORITY CLAIM AND CROSS-REFERENCE

This application claims the priority benefit of U.S. provisional application Ser. No. 62/856,970, filed on Jun. 4, 2019. The entirety of the above-mentioned patent application is hereby incorporated by reference herein and made a part of this specification.

TECHNICAL FIELD

The present disclosure relates to a system and a method for setting molding conditions of an injection-molding equipment, and more particularly, to a system and a method for setting actual molding conditions by optimizing provisional molding conditions generated in a virtual molding while taking into consideration a plurality of intermediate molding conditions obtained in a trial molding.

DISCUSSION OF THE BACKGROUND

Injection molding is an important industrial process for producing large quantities of complex plastic parts. New polymers and the demand for high-quality electronics, consumer products, automobiles and aircraft have forced engineers and designs to improve mold-tooling efficiency and the quality of final parts.

In general, the setting of molding conditions in an injection-molding machine requires a large number of trial molding operations and a lengthy setup time. The analytical data generated by a virtual molding process using computer-implemented simulation is based on idealistic cases that do not take into account properties of actual injection-molding machines or molding materials during molding processes. Consequently, the setup processes of an actual injection-molding machine depend greatly on the knowledge and experience of on-site technicians.

This Discussion of the Background section is provided for background information only. The statements in this Discussion of the Background are not an admission that the subject matter disclosed in this Discussion of the Background section constitute prior art to the present disclosure, and no part of this Discussion of the Background section may be used as an admission that any part of this application, including this Discussion of the Background section, constitutes prior art to the present disclosure.

SUMMARY

One aspect of the present disclosure provides a system. The system includes a computer and an injection-molding equipment. The computer is configured to simulate, via computer-aided simulation software, a virtual molding using a plurality of design parameters to generate a plurality of provisional molding conditions. The injection-molding equipment is associated with the computer and configured to perform at least one trial molding using the provisional molding conditions to obtain a plurality of intermediate molding conditions. The computer is configured to optimize the provisional molding conditions to obtain a plurality of actual molding conditions in accordance with the intermediate molding conditions.

In some embodiments, the computer optimizes the provisional molding conditions to obtain the actual molding conditions by simulating another virtual molding via the computer-aided simulation software.

In some embodiments, the system further includes an information center associated with the computer and the injection-molding equipment for collecting the provisional molding conditions and the intermediate molding conditions, wherein the computer optimizes the provisional molding conditions to obtain the actual molding conditions in accordance with the intermediate molding conditions receives from the information center.

In some embodiments, the information center further collects the actual molding conditions.

In some embodiments, the information center is coupled to the computer and the injection-molding equipment through a hard-wired connection or a wireless coupling.

In some embodiments, the intermediate molding conditions are obtained by monitoring real-time functions of the trial molding.

In some embodiments, the intermediate molding conditions are obtained by detecting a trial molded product.

In some embodiments, the actual molding conditions are obtained when at least one of the intermediate molding conditions is not consistent with the corresponding provisional molding condition.

In some embodiments, the actual molding conditions are obtained when at least one of the intermediate molding conditions exceeds an upper threshold or does not reach a lower threshold derived from the corresponding provisional molding condition.

In some embodiments, the computer is configured to produce a provisional molding sheet comprising the design parameters and the provisional molding conditions.

In some embodiments, the provisional molding conditions are entered into the injection-molding equipment manually.

In some embodiments, the design parameters are generated by taking consideration a plurality of test parameters obtained by conducting at least one testing moldings using the injection-molding equipment.

Another aspect of the present disclosure provides a method for setting actual molding conditions of an injection-molding machine. The method includes steps of conducting a virtual molding to generate a plurality of provisional molding conditions; performing at least one trial molding using the plurality of provisional molding conditions to obtain a plurality of intermediate molding conditions; and optimizing the provisional molding conditions by taking into consideration the plurality of intermediate molding conditions if at least one of the intermediate molding conditions is not in a range between an upper threshold and a lower threshold derived from the corresponding provisional molding condition.

In some embodiments, the method further includes a step of optimizing the provisional molding conditions by taking into consideration the plurality of intermediate molding conditions if at least one of the intermediate molding conditions is different from the corresponding provisional molding conditions.

In some embodiments, the method further includes a step of specifying design parameters of a product before the conducting of the virtual molding.

In some embodiments, the method further includes a step of conducting at least one test moldings using the injection-molding equipment to obtain a plurality of test parameters prior to the conducting of the virtual molding, wherein designed parameters are specified while taking into consideration the testing parameters.

In some embodiments, the method further includes a step of producing a provisional molding sheet comprising the design parameters and the provisional molding conditions.

In some embodiments, the method further includes a step of transmitting the provisional molding conditions, the intermediate molding conditions and the actual molding conditions to a server.

In some embodiments, the virtual molding is conducted and the provisional molding conditions are optimized by a computer, the trial molding is performed by an injection-molding equipment, and the computer and the injection-molding equipment are connected to the server through a network.

The foregoing has outlined rather broadly the features and technical advantages of the present disclosure in order that the detailed description of the disclosure that follows may be better understood. Additional features and technical advantages of the disclosure are described hereinafter, and form the subject of the claims of the disclosure. It should be appreciated by those skilled in the art that the concepts and specific embodiments disclosed may be utilized as a basis for modifying or designing other structures, or processes, for carrying out the purposes of the present disclosure. It should also be realized by those skilled in the art that such equivalent constructions do not depart from the spirit or scope of the disclosure as set forth in the appended claims.

BRIEF DESCRIPTION OF THE DRAWINGS

A more complete understanding of the present disclosure may be derived by referring to the detailed description and claims. The disclosure should also be understood to be coupled to the figures' reference numbers, which refer to similar elements throughout the description.

DETAILED DESCRIPTION

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Figure 1A:
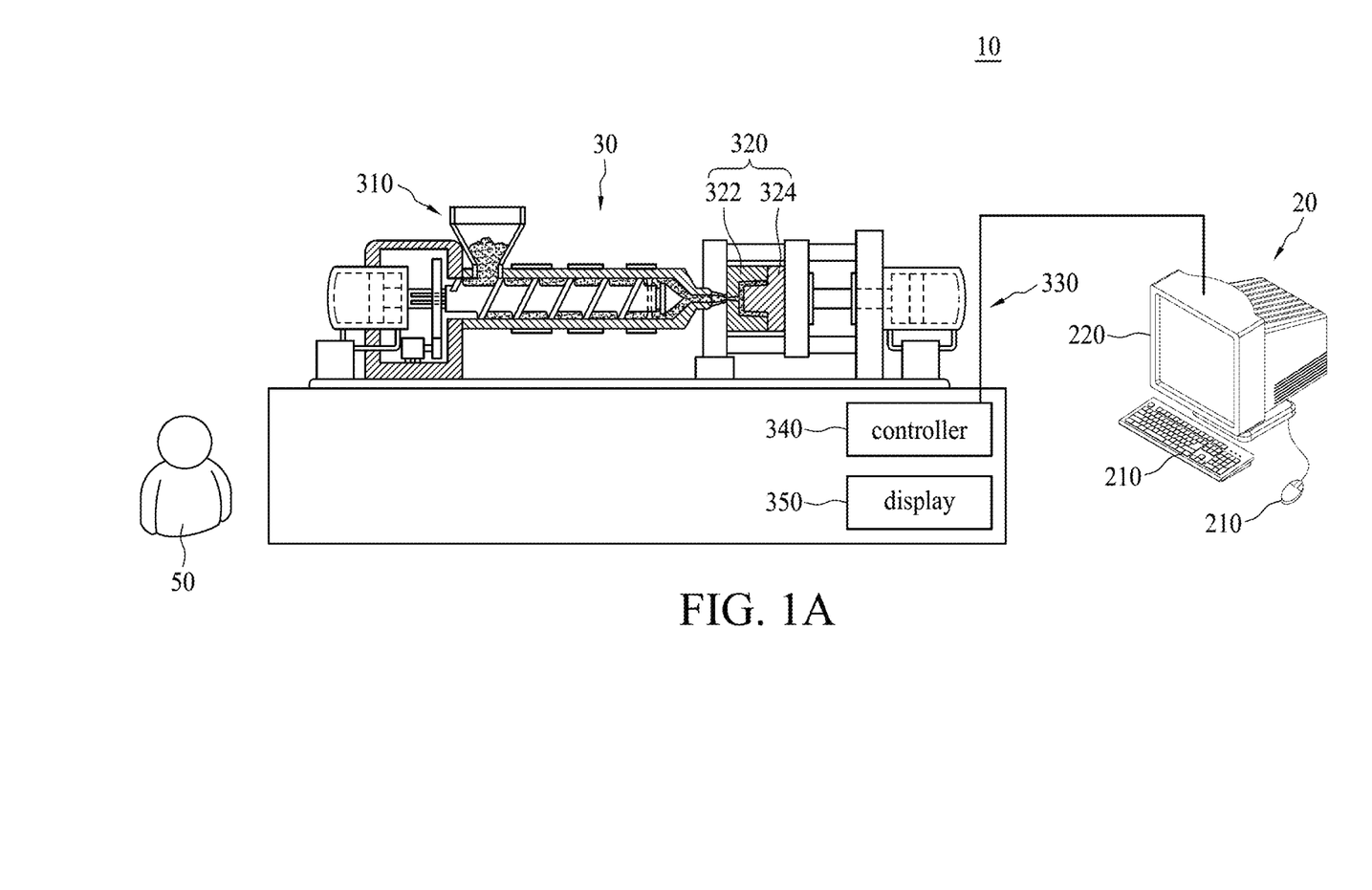
FIG. 1A illustrates a system in which molding conditions of an injection-molding equipment can be set in accordance with some embodiments of the present disclosure.

FIG. 1A illustrates a system 10 in which actual molding conditions of an injection-molding equipment 30 can be set in accordance with some embodiments of the present disclosure. Referring to FIG. 1A, in some embodiments, the system 10 includes a computer 20 and the injection-molding equipment 30, wherein the computer 20 can be physically connected to the injection-molding equipment 30. In some embodiments, the computer 20 may be wirelessly connected to the injection-molding equipment 30. The system 10 also includes an on-site technician 50, which may be a person operating the injection-molding equipment 30 and/or the person reading and/or interpreting a result.

The actual molding conditions of the injection-molding equipment 30 are set by optimizing a plurality of provisional molding conditions generated in a virtual molding conducted by the computer 20, via computer-aided engineering software, while taking into consideration a plurality of intermediate molding conditions obtained in at least one trial molding carried out by the injection-molding equipment 30, wherein the injection-molding equipment 30 performs the trial molding using the provisional molding conditions. In some embodiments, the intermediate molding conditions can be obtained by monitoring real-time functions of the trial molding or detecting/measuring a trial molded product. The intermediate molding conditions provided by the injection-molding equipment 30 are transmitted to the computer 20. In some embodiments, the intermediate molding conditions may be stored in a memory (not shown) of the computer 20.

Figure 1B:
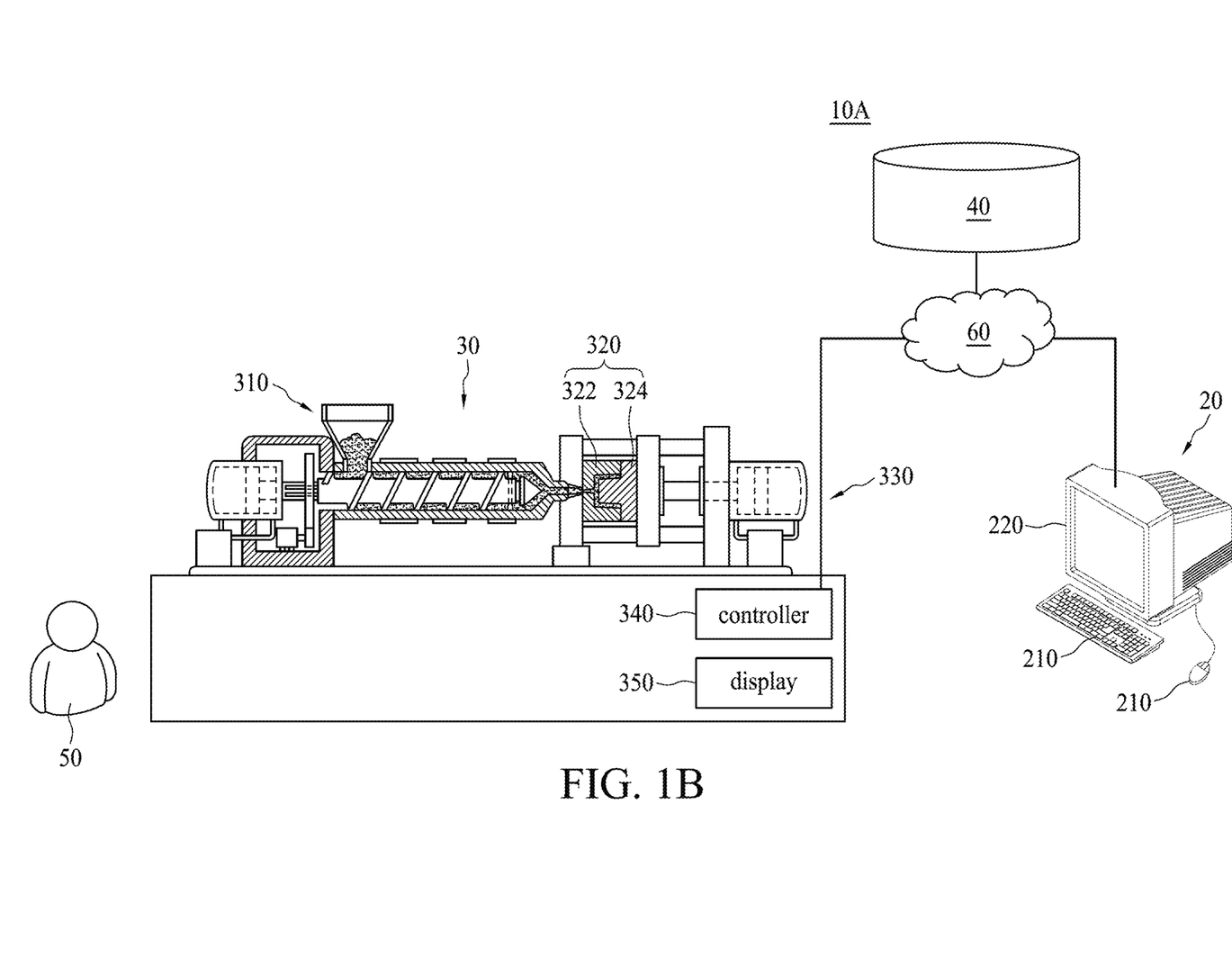
FIG. 1B illustrates a system in which molding conditions of an injection-molding equipment can be set in accordance with some embodiments of the present disclosure.

FIG. 1B illustrates a system 10A in which molding conditions of an injection-molding equipment 30 can be set in accordance with some embodiments of the present disclosure. It should be noted that the system 10A shown in FIG. 1B contains many features that are same as or similar to features of the system 10 disclosed with respect to FIG. 1A. For purpose of clarity and simplicity, details of same or similar features may be omitted, and the same or similar reference numbers denote the same or like components. The main difference between the systems 10A, shown in FIG. 1B, and the system 10 shown in FIG. 1A are described as follows.

Referring to FIG. 1B, the system 10 further includes an information center 40 associated with the computer 20 and the injection-molding equipment 30. The information center 40 is configured to collect the actual molding conditions, the provisional molding conditions and the intermediate molding conditions. In some embodiments, the intermediate molding conditions obtained from the trial molding can be regarded as indicators of quality of the provisional molding conditions. In some embodiments, the intermediate molding conditions may include injection velocity, injection pressure, injection temperature or the like during the trial molding. In alternative embodiments, the intermediate molding conditions may include weight, thickness or the likes of the trial molded product.

Referring again to FIG. 1B, the information center 40 can be a virtual server, and the computer 20 and the injection-molding equipment 30 are connected to the information center 40 through a network 60. In alternative embodiments, the information center 40 can be a physical server, and connections between the computer 20 and the information center 40, and between the injection-molding equipment 30 and the information center 40, can be hard-wired connections or wireless couplings.

The computer 20 is configured to execute a computer-aided engineering (CAE) simulation software to conduct the virtual molding (simulation). In some embodiments, the virtual molding is conducted using a plurality of design parameters entered into the computer 20 through at least one input device 210 accessible for entering data and process commands. The designed parameters may be obtained according to the experience of at least one on-site technician. Alternatively, the designed parameters can be specified while taking into consideration a plurality of testing parameters obtained from one or more of testing moldings conducted using the injection-molding equipment 30. The testing parameters can include an injection velocity profile, an injection pressure profile, a packing pressure profile, a molding temperature profile, and a clamping force profile. In some embodiments, the testing moldings are conducted by a buyer of the injection-molding equipment 30. In alternative embodiments, the testing moldings are conducted by an equipment supplier. The equipment supplier may provide the test parameters to the buyer.

Figure 2:
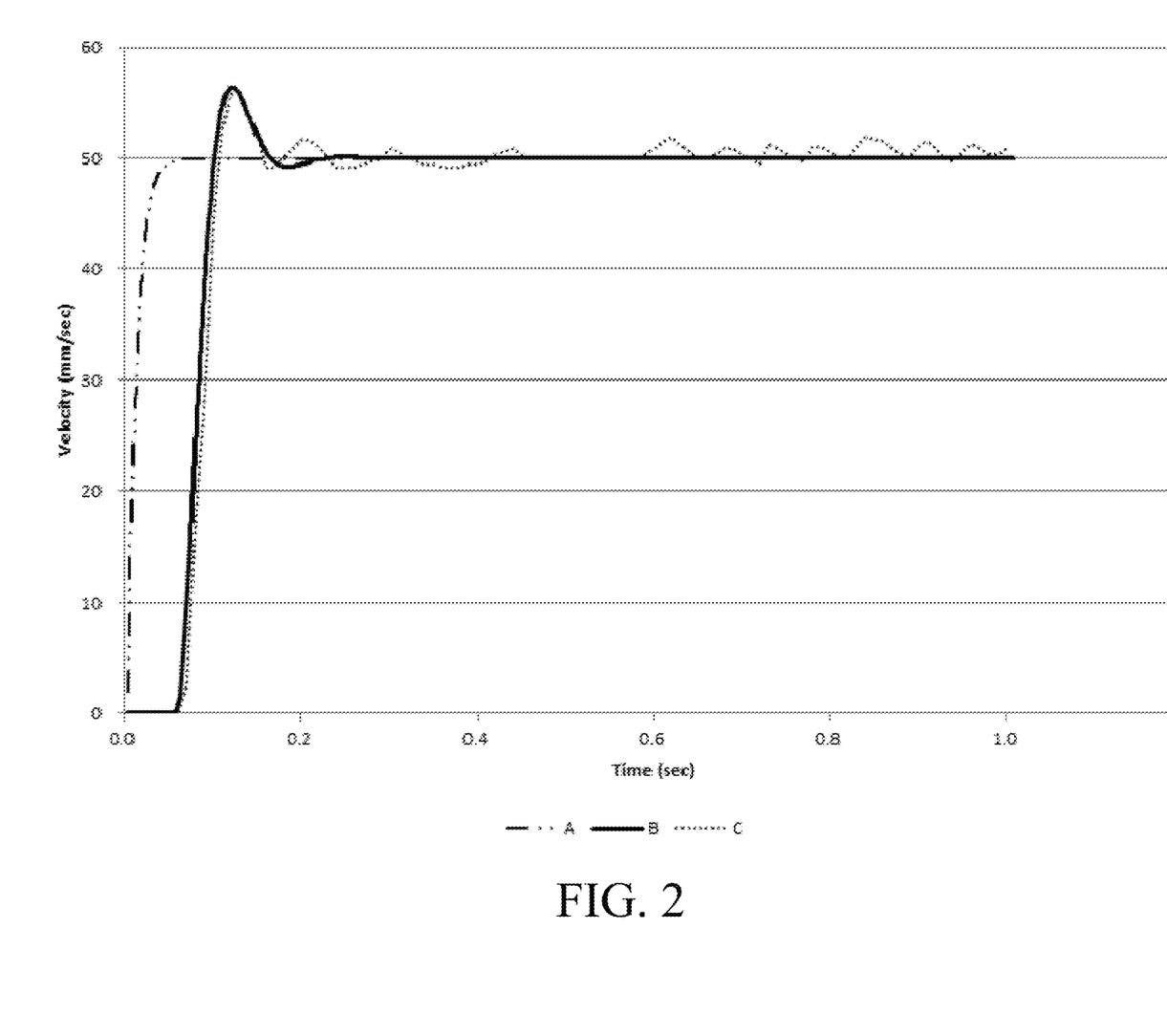
FIG. 2 is a chart showing a simulated injection velocity profile generated based on the experience of the on-site technician, a simulated injection velocity profile generated while taking consideration multiple testing parameters obtained from at least one testing molding, and an actual injection velocity profile obtained during conducting an actual molding using an injection-molding equipment.

Referring to FIG. 2 shows a waveform A indicating a simulated injection velocity generated based on the experience of the on-site technician, a waveform B indicating a simulated injection velocity generated while taking into consideration the testing parameters, and a waveform C indicating an actual injection velocity obtained from an actual molding. As can be seen in FIG. 2, the simulated injection velocity profile while taking into consideration the testing parameters substantially fits the actual injection velocity profile obtained from the actual molding.

Referring to FIGS. 1A and 1B again, the computer 20 may also include an output device 220 for displaying the entered data and the results of virtual molding. In some embodiments, the computer 20 may be, for example, a desktop computer or a laptop computer, the input device 210 includes a keyboard, mouse, touch input device, or the like, and the output device 220 includes a display, printer, or the like.

Figure 3:
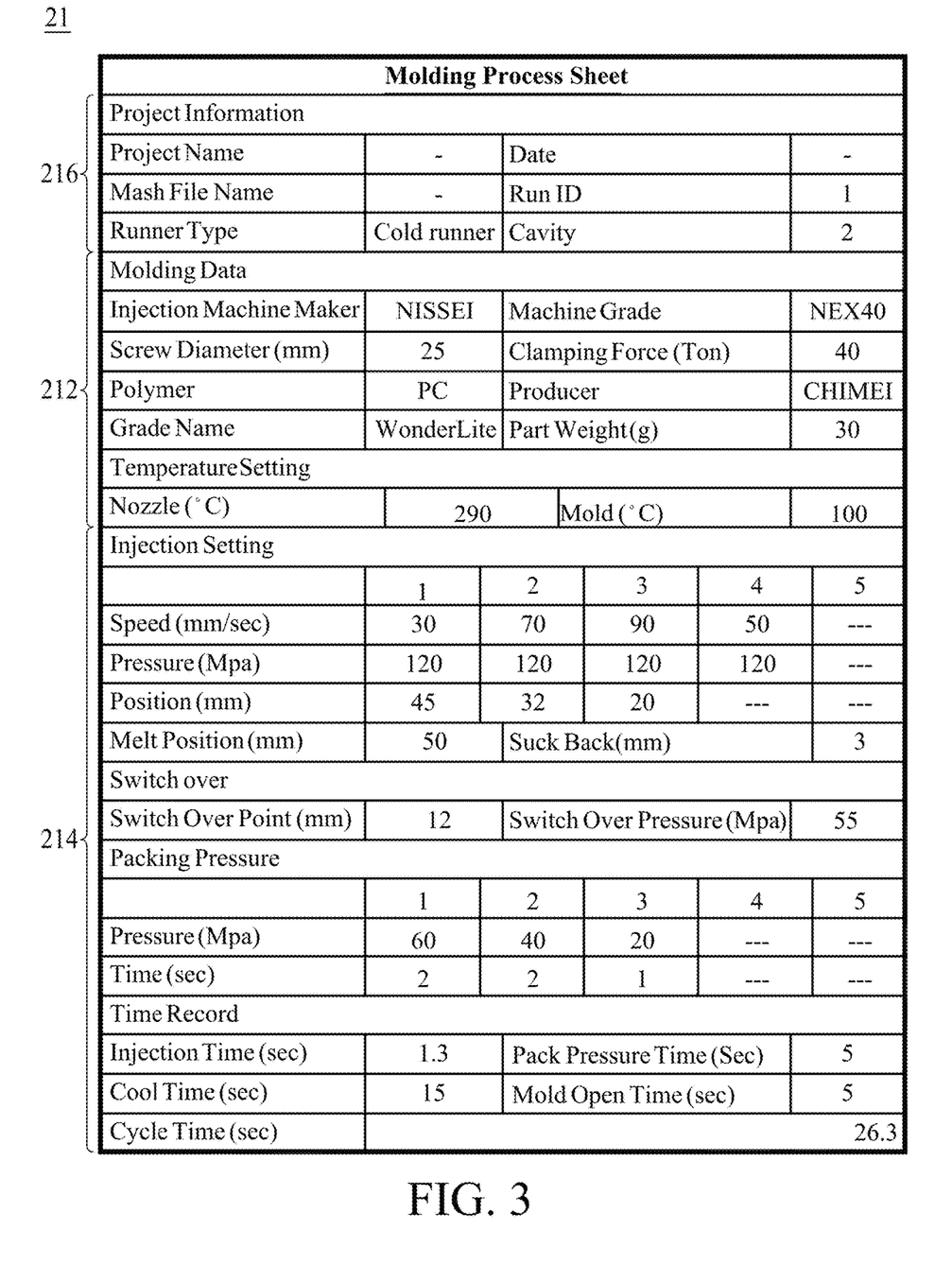
FIG. 3 is a data sheet for use in a method for setting molding conditions of an injection-molding equipment in accordance with some embodiments of the present disclosure.

In some embodiments, the computer 20 is also configured to produce a provisional molding sheet 21, as shown in FIG. 3, after completing the virtual molding. In some embodiments, the provisional molding sheet 21 includes a first section 212 including information related to the molding date, such as the design parameters, required to complete the virtual molding and the trial molding and a second section 214 including the provisional molding conditions. In some embodiments, the design parameters listed on the provisional molding sheet 21 may at least include screw diameter, clamping force and molding material; the provisional molding conditions may include injection speed, injection pressure, screw position, melt position and packing pressure. In some embodiments, the provisional molding sheet 21 may further include a third section 216 listing project information including project name and mesh file name.

Referring again to FIG. 1A, the computer 20 is configured to transmit data including the actual molding conditions, the provisional molding conditions, the project information and a simulation result of the virtual molding to the injection-molding equipment 30 through a connection such as a hard-wired connection or a wireless coupling. Referring again to FIG. 1B, the computer 20 can be further configured to transmit data including the actual molding conditions, the provisional molding conditions, the project information and a simulation result of the virtual molding to the information center 40 through hard-wired connections or wireless couplings. In some embodiments, the data may be automatically transmitted to the information center 40 from the computer 20 while the connection between the computer 20 and the information center 40 is created. In alternative embodiments, the data can be transmitted to the information center 40 from the computer 20 according to commands a user inputted by the input device 210.

The injection-molding equipment 30 includes a molding machine 310, a mold 320 connected to the molding machine 310, and a clamping assembly 330 used to clamp mold halves 322 and 324 of the mold 320. In some embodiments, the injection-molding equipment 30 further includes a controller 340 configured to control and monitor real-time functions of the molding machine 310 and a display 350 for displaying data related to the performance and operation of the molding machine 310 to the on-site technician 50. In some embodiments, the provisional molding conditions for running the trial molding using the injection-molding equipment 30 can be provided by the computer 20 (as shown in FIG. 1A) or the information center 40 (as shown in FIG. 1B). In alternative embodiments, the provisional molding conditions for running the trial molding are entered into the injection-molding equipment 30 manually by the on-site technician 50. In some embodiments, the on-site technician 50 can enter the provisional molding conditions into the injection-molding equipment 30 according to the provisional molding sheet 21 shown in FIG. 3.

Figure 4:
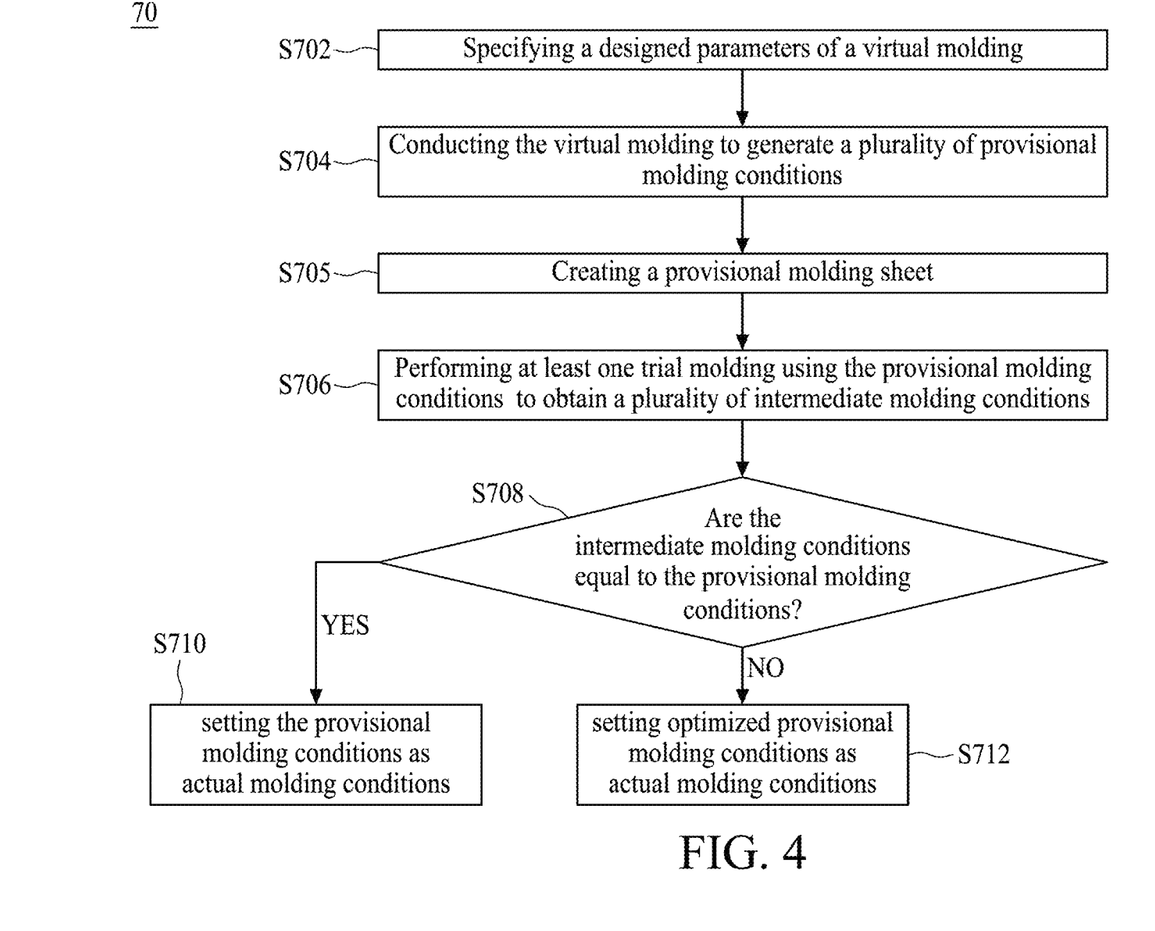
FIG. 4 is a flowchart of a method for setting actual molding conditions of an injection-molding equipment in accordance with some embodiments of the present disclosure.

FIG. 4 is a flowchart of a method 70 for setting actual molding conditions of an injection-molding equipment in accordance with some embodiments of the present disclosure. The method 70 includes steps S702, S704, S705, S706, S708, S710 and S712. The method may begin with step S702, in which design parameters of a virtual molding are specified. At step S704, the virtual molding is conducted to generate a plurality of provisional molding conditions. At step 705, a provisional molding sheet is created. At step 706, at least one trial molding is performed using the provisional molding conditions to obtain a plurality of intermediate molding conditions. At step S708, it is determined whether the intermediate molding conditions are the same as the corresponding provisional molding conditions. At step S710, if the intermediate molding conditions are the same as the corresponding provisional molding conditions, then the provisional molding conditions are set as the actual molding conditions. At step S712, if the intermediate molding conditions are not the same as the provisional molding conditions, then optimized provisional molding conditions are set as actual molding conditions.

The following describes an exemplary process flow of the method 70 for setting actual molding conditions of the injection-molding equipment in accordance with some embodiments of the present disclosure.

Figure 5:
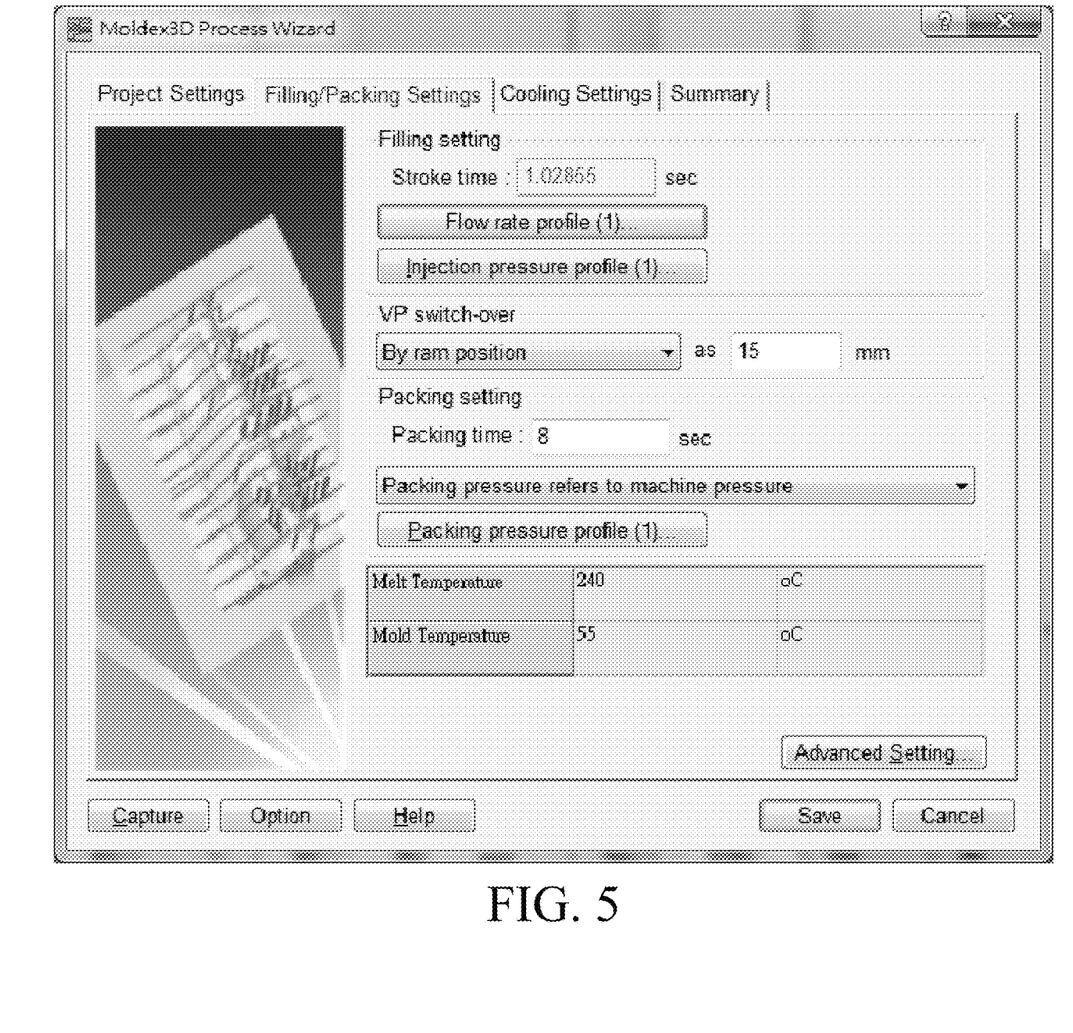
FIG. 5 shows an exemplary display of a screen for specifying design parameters on the computer of FIGS. 1A and 1B.

FIG. 5 shows an exemplary display of a screen for specifying design parameters on the computer of FIGS. 1A and 1B. Referring to FIGS. 1, 4 and 5, in some embodiments, the method 70 can begin at step S702, in which the design parameters of a virtual molding are specified. In some embodiments, the design parameters can be inputted into the computer 20 to execute a computer-aided simulation software by a user. In some embodiments, the design parameters at least include screw diameter, clamping force, molding material, stroke time, flow rate profile, injection pressure profile, packing pressure profile, melt temperate and a mold temperature. The designed parameters may be obtained according to the experience of at least one on-site technician. Alternatively, the designed parameters can be specified while taking into consideration a plurality of testing parameters obtained from one or more of testing moldings conducted using the injection-molding equipment 30.

Figure 6:
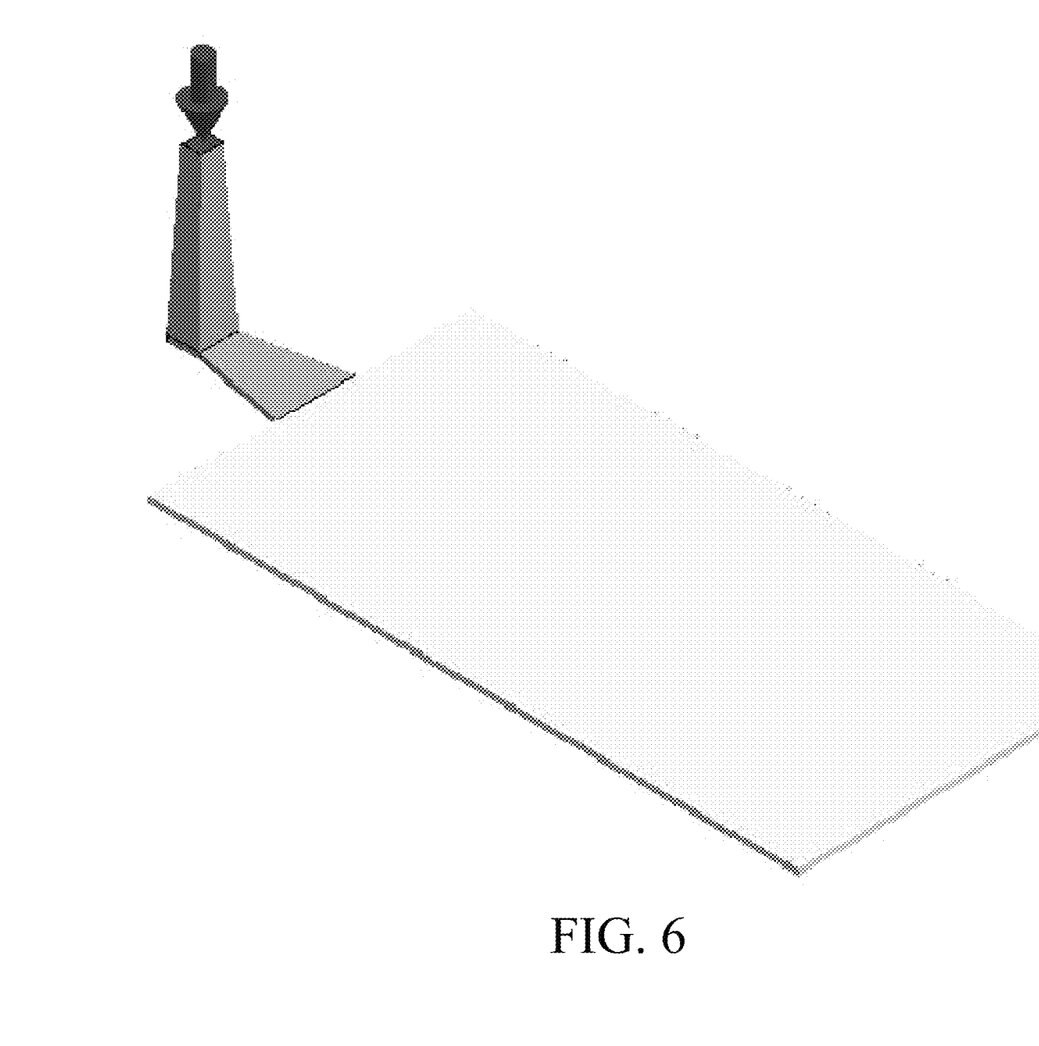
FIG. 6 shows an exemplary display of a screen for conducting a virtual molding on the computer of FIGS. 1A and 1B.

FIG. 6 shows an exemplary display of a screen for conducting a virtual molding on the computer of FIGS. 1A and 1B. Referring to FIGS. 1, 4 and 6, in some embodiments, the method 70 can continue with step S704, in which the virtual molding is conducted by the computer 20 and a plurality of provisional molding conditions are generated.

The method 70 can continue with step S706, in which the provisional molding sheet 21, as shown in FIG. 3, is created. The provisional molding sheet 21 can be shown on the display 220 of the computer 20 or outputted from the printer connected to the computer 20.

Figure 7A:
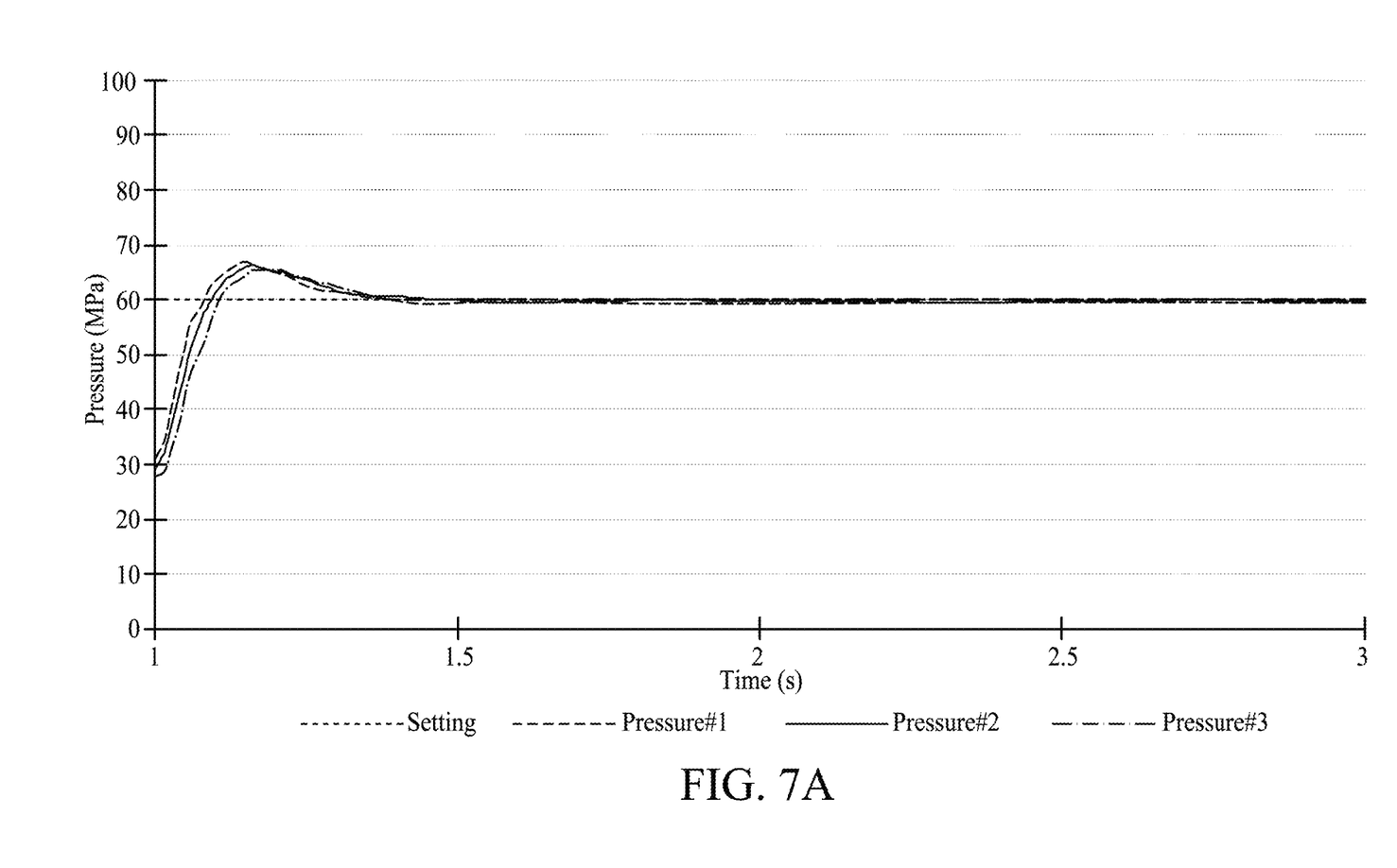
FIG. 7A shows a setting waveform and measured waveforms of the injection pressure.
Figure 7B:
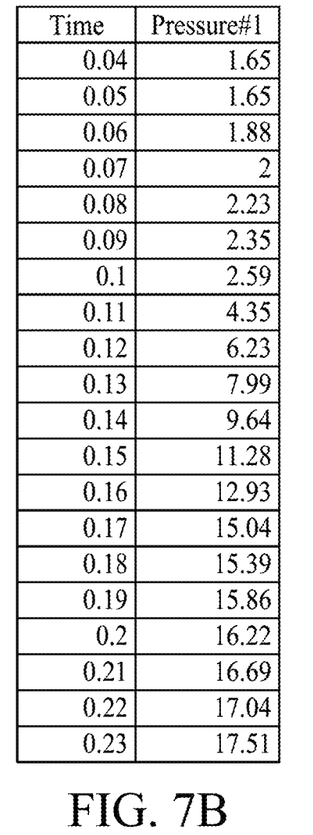
FIG. 7B shows a display screen showing measured injection pressure during the trial molding process.

The method 70 can continue with step S706, in which at least one trial molding is performed using the provisional molding conditions to obtain a plurality of intermediate molding conditions. FIG. 7A shows a setting waveform and measured waveforms of the injection pressure, and FIG. 7B shows a display screen showing measured injection pressure during the trial molding. Referring to FIGS. 1, 7A and 7B, in some embodiments, the trial molding is carried out by the injection-molding equipment 30, wherein the controller 340 of the injection-molding equipment 30 can monitor real-time functions of the trial molding and generate the intermediate molding conditions. The intermediate molding conditions can be graphically displayed on the display 350 of the injection-molding equipment 30, as shown in FIG. 7A. In alternative embodiments, the intermediate molding conditions can be provided in a table, as shown in FIG. 7B. The intermediate molding conditions can be then transmitted to the computer 10 as shown in FIG. 1A. Alternatively, the intermediate molding conditions are then transmitted to the computer 10 through the information center 40 shown in FIG. 1B.

The method 70 can continue with step S708, in which it is determined whether the intermediate molding conditions are the same as the corresponding provisional molding conditions. If affirmative, the method 70 proceeds to step S710, in which the provisional molding conditions are set as actual molding conditions. If negative, the method 70 proceeds to step S712, in which the provisional molding conditions are optimized in accordance with the intermediate molding conditions and the optimized provisional molding conditions are then set as the actual molding conditions.

In some embodiments, the comparison between the intermediate molding conditions and the provisional molding conditions is determined by the computer 20. In some embodiments, the provisional molding conditions can be optimized by performing the virtual molding again and using the intermediate molding conditions as some of the design parameters.

Figure 8:
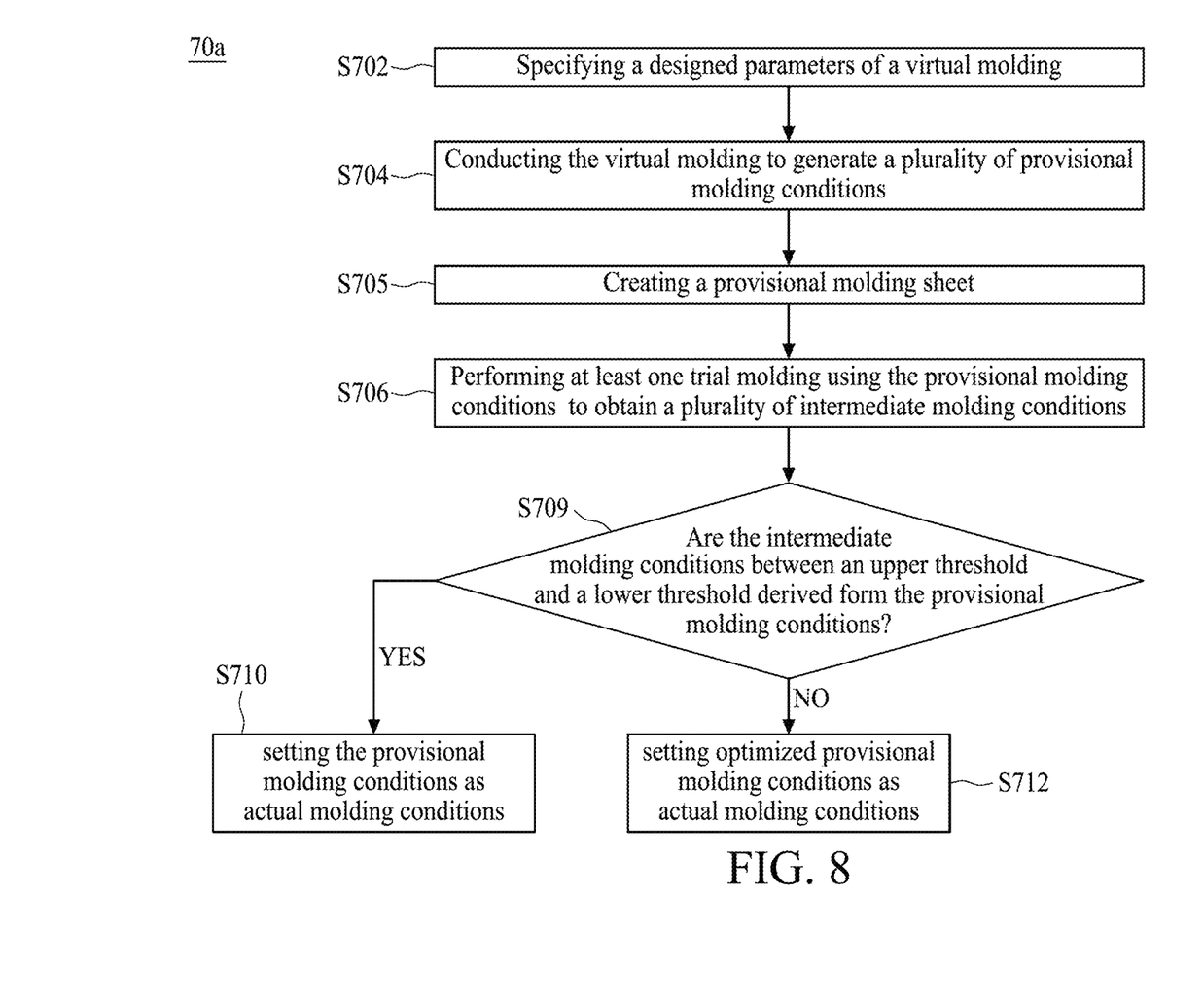
FIG. 8 is a flowchart of a method for setting actual molding conditions of an injection-molding equipment in accordance with some embodiments of the present disclosure.

FIG. 8 is a flowchart of a method 70a for setting actual molding conditions of an injection-molding equipment in accordance with some embodiments of the present disclosure. The method 70a includes steps S702, S704, S705, S706, S709, S710 and S712. The method 70a may begin with step S702, in which design parameters of a virtual molding is specified. At step S704, the virtual molding is conducted to generate a plurality of provisional molding conditions. At step 705, a provisional molding sheet is created. At step 706, at least one trial molding is performed using the provisional molding conditions to obtain a plurality of intermediate molding conditions. At step S709, it is determined whether the intermediate molding conditions are between an upper threshold and a lower threshold derived from the corresponding provisional molding conditions. At step S710, if the intermediate molding conditions are between the upper threshold and the lower threshold derived from the corresponding provisional molding conditions, and then the provisional molding conditions are set as the actual molding conditions. At step S712, if at least one of the intermediate molding conditions exceeds the upper threshold or fails to reach the lower threshold, then optimized provisional molding conditions are set as actual molding conditions.

Figure 9:
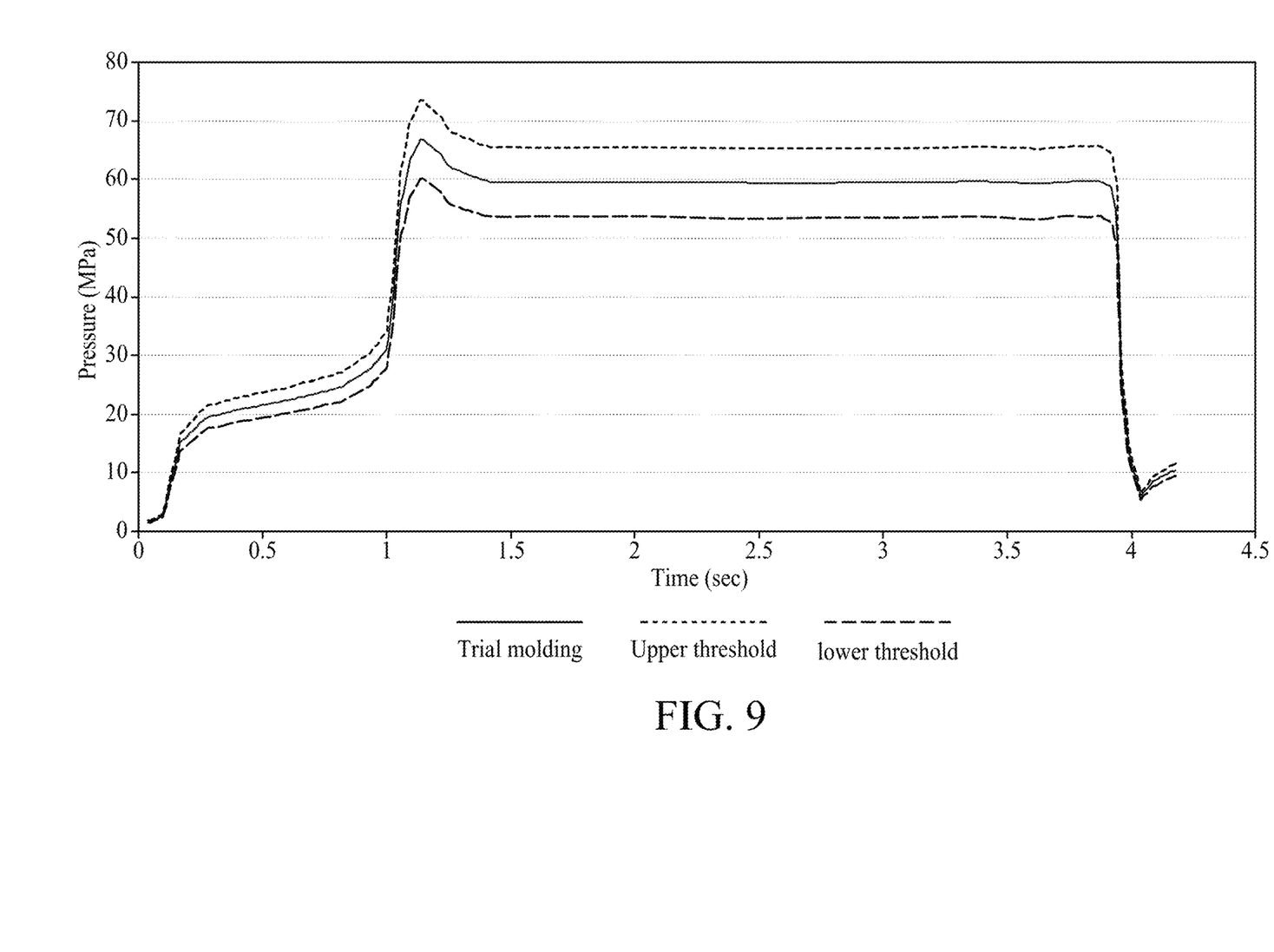
FIG. 9 shows waveforms of the trial molding pressure, the upper threshold pressure and the lower threshold pressure.

FIG. 9 shows waveforms of the trial molding pressure, the upper threshold pressure and the lower threshold pressure, wherein the upper threshold and the lower threshold are derived from the corresponding provisional molding conditions. In FIG. 9, the trial molding pressure is between the upper threshold and the lower threshold, and thus the method 70a proceeds to step S710, in which the provisional molding conditions are set as the actual molding conditions. However, if trial molding pressure exceeds the upper threshold or fails to meet the lower threshold, the method 70a proceeds to step S712, in which the provisional molding conditions are optimized in accordance with the intermediate molding conditions and the optimized provisional molding conditions are then setting as the actual molding conditions. In some embodiments, the upper threshold and the lower threshold can be set manually. In alternative embodiments, the upper threshold and the lower threshold can be determined by data stored in the computer 30 shown in FIG. 1A or the information center 40 shown in FIG. 1B. In some embodiments, the computer 20 may generate an actual molding sheet includes the design parameters and the actual molding conditions after completing the optimization.

In conclusion, the present disclosure sets the actual molding conditions of the injection molding by adjusting provisional molding conditions generated from the virtual molding in accordance with the intermediate molding conditions obtained from the trial molding. As a result, the molding defect can be eliminated.

One aspect of the present disclosure provides a system for setting injection-molding conditions. The system includes a computer and an injection-molding equipment. The computer is configured to simulate, via computer-aided simulation software, a virtual molding using a plurality of design parameters to generate a plurality of provisional molding conditions. The injection-molding equipment is configured to perform at least one trial molding using the provisional molding conditions to obtain a plurality of intermediate molding conditions. The computer optimizes the provisional molding conditions to obtain actual molding conditions in accordance with the intermediate molding conditions.

One aspect of the present disclosure provides a method for setting actual molding conditions of an injection-molding machine. The method includes steps of conducting a virtual molding to generate a plurality of provisional molding conditions; performing at least one trial molding using the plurality of provisional molding conditions to obtain a plurality of intermediate molding conditions; and, if at least one of the intermediate molding conditions is not between an upper threshold and a lower threshold derived from the corresponding provisional molding condition, optimizing the provisional molding conditions by taking into consideration the plurality of intermediate molding conditions.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods and steps.

What is claimed is:

1. A method for setting actual molding conditions of an injection-molding machine, comprising:
   conducting a virtual molding to generate a plurality of provisional molding conditions;
   after conducting the virtual molding, performing at least one trial molding using the plurality of provisional molding conditions to obtain a plurality of intermediate molding conditions; and
   after performing the at least one trial molding, optimizing the plurality of provisional molding conditions generated in the virtual molding, to obtain the actual molding conditions, by taking into consideration the intermediate molding conditions obtained in the at least one trial molding if at least one of the intermediate molding conditions is not between an upper threshold and a lower threshold derived from the corresponding provisional molding condition.

2. The method of claim 1, further comprising:
   optimizing the plurality of provisional molding conditions by taking into consideration the plurality of intermediate molding conditions if at least one of the intermediate molding conditions is different from the corresponding provisional molding conditions.

3. The method of claim 1, further comprising:
   specifying design parameters of the virtual molding.

4. The method of claim 3, further comprising conducting a plurality of test moldings using the injection-molding equipment to obtain a plurality of test parameters prior to the conducting of the virtual molding, wherein the designed parameters are specified while taking into consideration the testing parameters.

5. The method of claim 1, further comprising:
   producing a provisional molding sheet comprising the design parameters and the plurality of provisional molding conditions.

6. The method of claim 5, further comprising:
   transmitting the plurality of provisional molding conditions and the intermediate molding conditions to a server.

7. The method of claim 6, wherein the virtual molding is conducted and the plurality of provisional molding conditions are optimized by a computer, the trial molding is performed by an injection-molding equipment, and the computer and the injection-molding equipment are connected to the server through a network.

* * * * *